United States Patent [19]

Taylor

[11] 3,947,341

[45] Mar. 30, 1976

[54] SCALE INHIBITION
[75] Inventor: Alwyn H. Taylor, Newton, Mass.
[73] Assignee: The United States of America as represented by the Secretary of the Interior, Washington, D.C.
[22] Filed: Aug. 29, 1974
[21] Appl. No.: 501,550

[52] U.S. Cl. ............................................. 204/181
[51] Int. Cl.² ................... C25D 13/08; C25D 13/14
[58] Field of Search .................................... 204/181

[56] References Cited
UNITED STATES PATENTS
2,961,384  11/1960  Scoggs et al. ..................... 204/14
3,385,777  5/1968  Haycock et al. ..................... 204/181

*Primary Examiner*—Howard S. Williams
*Attorney, Agent, or Firm*—William S. Brown; Donald R. Fraser

[57] ABSTRACT

Scale formation on heat exchanger surfaces in contact with solutions containing scale-forming salts is inhibited by electrodeposition of polymerized phenol or phenylenediamine on the surfaces. The deposition is accomplished by holding the heat exchange surfaces at a controlled electrical potential in the presence of a solution containing a low concentration of the monomer.

4 Claims, No Drawings

SCALE INHIBITION

Scale formation on heated surfaces is a continuous problem in evaporation of waters containing scale-forming salts, e.g., in distillation of sea water, steam boilers, etc. Specifically, heat exchanger surfaces of evaporative desalination plants are subject to formation of large quantities of scale, particularly calcium sulfate, resulting from the presence of high concentrations of scale-forming divalent cations and anions. This scale impedes heat transfer through the walls of the heat exchanger and seriously interferes with the efficiency of the process.

Various organic compounds such as polyacrylic acid, polyphosphates, etc., have previously been used for scale inhibition. However, they have generally suffered from a variety of deficiencies such as high cost, poor stability, ineffectiveness at high temperatures, etc.

It has now been found that a significant reduction in scale deposition may be achieved by means of an initial electrodeposition of a thin layer of a polymer of phenol or ortho or metaphenylenediamine on the interior heat exchanger surface, i.e., the surface that contacts the feed solution during the evaporation process. This deposition is accomplished by holding the heat exchange surfaces at a controlled electrical potential in the presence of a solution containing a low concentration of monomeric phenol or phenylenediamine. The controlled potential causes polymerization of the monomer and deposition of the resulting polymer onto the heat exchanger surfaces. The technique permits exact control of the thickness of the deposited layer, and the layers so deposited are extremely stable even to a range of organic solvents, strong acids and strong alkalis.

The heat exchanger, the surface of which is treated according to the process of the invention, may be of any material conventionally employed for the above-discussed purposes. E.g., it may consist of stainless steel, nickel, copper, copper-nickel alloy, etc. It may also be of any conventional size and shape, e.g., it may be flat, or curved as in the case of tubular condenser units.

Deposition of the polymer may be carried out from any conductive solution, including sea water. Accordingly, the scale-inhibiting pretreatment of the invention may be carried out while the heat exchanger surfaces are in contact with the feed solution to be evaporated. Once formed, the scale-inhibiting layer of the invention does not require the imposition of an electrical potential and any excess organic monomer may, therefore, be removed from the solution.

The conductive solution will generally consist of an aqueous solution of a salt, or salts, in a concentration sufficient to provide adequate conductivity for the polymerization process. The polymerization may be affected even in the presence of chloride ions, as in the case where sodium chloride is used to provide adequate conductivity. The pH of the solution may range from about 2 to 11.2. However, optimum pH will vary with the nature of the heat exchanger surfaces, e.g., where the heat exchanger consists of stainless steel or nickel, a pH of about 5.5 is usually preferred while a pH of about 10 to 10.5 generally gives best results with copper or copper-nickel heat exchangers. Ambient conditions of temperature and pressure are generally satisfactory, although the deposition can generally be carried out over a considerable range of temperature, e.g., about 10° to 100°C.

Optimum concentration of the monomer in the conductive solution during the deposition process will depend on the specific conductive solution and monomer employed, the nature of the heat exchanger surfaces, value of the applied voltage, etc., and is best determined experimentally. However, a concentration of about $10^{-6}$ to $10^{-2}$ M is usually satisfactory.

Polymerization of the monomer, and deposition of the resulting polymer on the heat exchanger surfaces, is accomplished by application of an electrical potential to the exchanger surfaces. This procedure is conventional and is disclosed in numerous prior art patents, e.g., U.S. Pat. Nos. 3,645,871 and 3,645,872. Typically, the monomer-containing conductive solution is placed in contact with an electrically conductive cathode, which may consist of any conventional electrode material, and the exchanger surfaces, which serve as the anode. Where the heat exchanger surfaces comprise distillation apparatus or boilers, the electrodeposition process may be carried out by simply adding the appropriate amount of monomer to the feed water in the distillation apparatus or boiler. Application of a suitable electric potential to the distillation apparatus or boiler, connected as the anode, results in polymerization and deposition of the scale-inhibiting polymer, and the feed water may then be distilled or evaporated with substantial reduction of scale deposition.

Optimum values of applied voltage in the deposition process will vary with the size, shape and composition of the heat exchanger surface, the nature of the feed solution, specific monomer employed, desired thickness of the resulting layer of scale-inhibiting polymer, etc., and is best determined experimentally. A range of about 0.35 to 0.7 volts versus a calomel electrode usually gives good results. Resulting deposition currents are typically in the range of about 0.5 to 10 microamps per square centimeter of heat exchanger surface.

Optimum time for completion of the deposition process will also depend on the above-discussed variables, but it may vary over a range of about 1 to 50 hours. Generally, the thickness of the deposit increases with increased concentration of monomer in solution and increased deposition time. A deposit of sufficient thickness to be visible usually provides good scale inhibition. However, the deposit does not necessarily have to be visible to provide adequate scale inhibition.

The invention will be more specifically illustrated by the following examples.

EXAMPLES 1–5

Scale-inhibiting layers of polymer were deposited on flat metal plates, which were then tested for scale inhibition. Reactants, reaction conditions and results are given in Table 1. The monomer was polymerized and deposited on the metal plate from an aqueous solution having the pH and monomer concentrations given in Table 1. Applied voltages and time of treatment are also given in table 1. Example 2 additionally contained 0.2 M KCl + 0.2 M HCl buffer.

Scale inhibition by the polymeric layers was tested by subjecting one surface of the treated plates to an aqueous solution 0.05 M in calcium sulfate and 1.3 M in sodium chloride at a temperature of 85°C (bulk temperature of the saline solution), under a pressure of 10 psi of nitrogen and with stirring, for a period of 2 hours. The reverse surface of each test plate was concurrently heated by contact with ethylene glycol at 130°C to establish conditions for calcium sulfate hemihydrate scale formation at the test surface/bulk solution interface. Nitrogen pressure was applied to prevent boiling applied voltage of 0.5 V. Polymerization pH was 5.5 where the metal was stainless steel or nickel, and 10.5 where the metal was copper or copper-nickel alloy. Polymer layer formation times are given in Table 2.

TABLE 2

| Example | Metal | Polymer layer Formation Time,hrs. | Test Period, hrs. | Layer Appearance | Scale Control Value (mg $Ca^{--}$) | mg Scale with Inhibiting Layer | % Inhibition |
|---|---|---|---|---|---|---|---|
| 6 | Stainless Steel | 18 | 22 | Dark Brown | 44.1 | 0.3 | 99.3 |
| 7 | Stainless Steel | 5 | 22 | Light Yellow-/Brown | 44.1 | 0 | 100 |
| 8 | Stainless Steel | 1 | 22 | Not visible | 44.1 | 0 | 100 |
| 9 | Stainless Steel | 0.5 | 22 | Not visible | 44.1 | 1.0 | 97.7 |
| 10 | Copper | 18 | 57 | Copper colored | 75.8 | 0 | 100 |
| 11 | Nickel | 18 | 50 | Black | 10.8 | 0.4 | 96.3 |
| 12 | Copper/Nickel (70/30) | 18 | 22 | Green/Yellow | 76.0 | 0 | 100 |
| 13 | Copper/Nickel | 4 | 22 | Yellow | 76.0 | 0 | 100 |
| 14 | Copper/Nickel | 1 | 22 | Not visible | 76.0 | 0 | 100 | at this interface where the estimated temperature was 115°C. The plates were then removed and the amount of scale formed on the plates was measured by titration of the scale with EDTA. Controls, without scale-inhibition treatment, were also subjected to the same treatment, with the amount of scale also determined by titration with EDTA. Results, showing a high degree of scale inhibition, are given in Table 1.

TABLE 1

| Example | Monomer | Metal | Conditions of Polymerization | Scale Control Value (mg $Ca^{--}$) | mg Scale With Inhibiting Layer | % Inhibition |
|---|---|---|---|---|---|---|
| 1 | Phenol | Platinum | pH 10.5, $10^{-3}$ M 2 hr. 0.7 V | 78.7 | 3.2 (14 hr) | 95.9 |
| 2 | o-phenylenediamine | Platinum | pH 2, ($Cl^-$) $10^{-2}$ M, 16 hr, 0.7 V | 78.7 | 3.6 | 95.4 |
| 3 | m-phenylenediamine | Platinum | pH 5.5, $10^{-3}$ M 56 hr, 0.7 V | 78.7 | 0.5 | 99.4 |
| 4 | m-phenylenediamine | Platinum | pH 5.5, $10^{-3}$ M 2 hr, 0.5 V | 78.7 | 1.3 | 98.3 |
| 5 | m-phenylenediamine | Stainless Steel | pH 5.5, $10^{-2}$ M 18 hr, 0.5 V | 63.0 | 0.3 | 99.5 |

EXAMPLES 6–14

These examples show longer term scale inhibiting data for polymer deposited on various metal surfaces. Scale-inhibiting layers of polymer were again deposited on flat metal plates, which were then tested for scale inhibition by the same procedure as that employed in examples 1–5.

The monomer employed was in each case m-phenylenediamine, and the polymerizations were carried out at a monomer concentration of $10^{-2}$ M and an applied voltage of 0.5 V. Polymerization pH was 5.5

I claim:

1. A process for electrodeposition of a scale-inhibiting layer of polyphenylenediamine on a metallic heat exchange surface comprising contacting the heat exchange surface with a conductive aqueous solution of a monomeric phenylenediamine while holding the heat exchange surface at a controlled electrical potential for a time sufficient to effect polymerization of the monomer and deposition of the resulting polymer on the heat exchange surface.

2. The process of claim 1 in which the phenylenediamine is o-phenylenediamine.

3. The process of claim 1 in which the phenylenediamine is m-phenylenediamine.

4. The process of claim 1 in which the conductive aqueous solution consists of a solution of the monomeric phenylenediamine in sea water.

* * * * *